_United States Patent Office_ 2,915,534
Patented Dec. 1, 1959

2,915,534

2,5-BIS(p-AMINOPHENYL)FURAN DERIVATIVES

Robert S. Long, Bound Brook, N.J., and John E. Pretka, Wilmington, Del., assignors to American Cyanamid Company, New York, N.Y., a corporation of Maine No Drawing. Original application December 31, 1953, Serial No. 401,734, now Patent No. 2,852,503, dated September 16, 1958. Divided and this application November 29, 1956, Serial No. 624,988

12 Claims. (Cl. 260—347.2)

This invention relates to new compounds of the diphenyl furan series and, more specifically, to 2,5-bisaryl furans in which the said aryl radicals are carbocyclic radicals of less than three rings having at least one substituent including one but not more than one substituent of the group consisting of amino, alkylated amino, and acylated amino. These compounds, especially those in which the amino or substituted amino group is para to the furan bond are useful as brighteners or ultraviolet absorbers and as intermediates for these products, dyes, pigments, etc.

The simplest example of a compound of this type, viz. 2,5-bis(para-aminophenyl)-furan, is a valuable intermediate from which dyes, pigments, brighteners and ultraviolet absorbers for plastics and other uses may be prepared. For example, the acyl derivatives of this diamine, as well as its sulfonated derivatives, possess fluorescence and can be used as brighteners. The sulfonated derivatives are particularly useful in this respect because they are water-soluble and have affinity for cellulosic materials. The N,N-dialkyl derivatives have less affinity for cellulosic materials but can be used as ultraviolet absorbers in plastics and to whiten materials such as wool, nylon, and acetate. For such uses the unsulfonated compounds are often preferable. Alternatively, the amino groups of 2,5-bis(para-aminophenyl)-furan can be diazotized and coupled to give azoic dyestuffs and pigments. The sulfonated derivatives can be similarly treated to produce azo dyes.

In our method of preparing 2,5-bis(para-aminophenyl)-furan, fumaryl chloride is condensed with acetanilide to give 1,2-bis(para-acetamidobenzoyl)-ethylene. The latter compound is then ring closed with simultaneous introduction of the required two hydrogen atoms by treatment with a mixture of hydrobromic acid, acetic acid and beta-naphthol. The resultant 2,5-bis(para-acetamidophenyl)-furan can be converted to the free diamine by hydrolysis with aqueous-alcoholic HCl. Other methods of preparation, for example, cyclization of 1,2-bis(para-acetamidobenzoyl)-ethane, are, of course, apparent. The protecting acyl group can be any other acyl group such as the homologous alkanoyls or the aroyl groups shown below for use in preparing the brighteners of our invention.

Some of the uses for this new compound require that the molecule be sulfonated. This can be done in two ways. When a 2,5-bis(acylaminophenyl)-furan is sulfonated in concentrated sulfuric acid under mild conditions, a mono-sulfonic acid results. It is most surprising that this sulfonation can take place since furans are believed to be destroyed by strong acids unless stabilizing negative substituents are present. The fact that only one sulfonic acid group is introduced under such mild conditions indicates that sulfonation is occurring in the furan ring in the 3-position.

If, instead of sulfonation in strong sulfuric acid, the sulfate of the free diamine is baked, disulfonation occurs. These sulfonic groups are believed to be in the phenyl rings, probably ortho to the amino groups. We do not wish to be limited however to any theory as to the location of the sulfonic acid groups because there is no proof as to their identity. It is possible, for example, that re-arrangement of the sulfate results in the introduction of one sulfo group in the furan ring and one in the expected ortho position in the benzene ring.

To obtain water-soluble brighteners, the bis(para-aminophenyl)-furan-disulfonic acid can be acylated or the unsulfonated bis(para-aminophenyl)-furan can be first acylated and then sulfonated in concentrated sulfuric acid to give the monosulfonic acid derivative. Such acylation can be carried out with any of the acylating agents commonly used, such as benzoyl chloride and its alkyl, alkoxy and acylamino derivatives. Examples of the latter are para-methoxybenzoyl chloride, ortho-methoxybenzoyl chloride, 2,4-dimethoxybenzoyl chloride, 2,4-diethoxybenzoyl chloride, ortho-toluyl chloride, para-toluyl chloride, para-acetamidobenzoyl chloride, para-benzamido benzoyl chloride, 2-methoxy-4-methylbenzoyl chloride and the like. Alternatively, these acylamino compounds can be synthesized by using the corresponding anilide in the synthesis of the diaryl furan ring system as described earlier.

To obtain azo dyes the bis(para-aminophenyl)-furan and its sulfonic acid derivatives can be diazotized and coupled to any selected coupling component such as phenols, naphthols, aminophenols, aminonaphthols, naphtholsulfonic acids, aminonaphtholsulfonic acids and the like. When the unsulfonated diamine is used, azoic dyes and pigments can be prepared by coupling with unsulfonated phenols, naphthols, amines, oxynapthoic arylides, acetoacetarylides and the like. Stabilized tetrazos can be prepared by coupling the tetrazo to alkylamino sulfonic or carboxylic acids. These can be used with the various naphthols such as oxynaphthoic arylides. The coupling products which contain no sulfonic acid groups can also be used as pigments.

Of particular value in the dyestuff field are the diaminodiarylfurans containing metallizable groups ortho to the amino groups. The term "metallizable groups" includes hydroxyl, carboxyl, halogen, alkoxy —OCH$_2$COOH and —SCH$_2$COOH.

When these groups are present the azo dyes obtained can be converted to metal complexes. These complexes are particularly useful for the dyeing of cotton and rayon in attractive shades and are much faster to light than the unmetallized dyes. The most stable and useful complexes are those derived from dyes in which the coupling component also contains a metallizable group ortho to the azo linkage. Generally, copper is the most useful metal, but other metals may be used, especially nickel, cobalt, iron and chromium. Again, using an unsulfonated diaminodiphenylfuran and unsulfonated coupling components, azo pigments may be obtained and in these cases may be metallized to yield unique shades of improved fastness.

These new intermediates may be made by the same general procedures outlined above. Thus, using acetcresidide there is obtained 2,5-bis(2-methyl-4-amino-5-methoxyphenyl)-furan. Other useful starting materials are O,N-diacetyl-o-aminophenol, N-acetyl-2-aminophenoxyacetic acid, acet-o-chloranilide, N-acetyl-2-methoxy-5-chloroaniline, N-acetyl-2,5-dimethoxyaniline, acet-o-butylanilide, acet-o-bromanilide, 4-acetamidodiphenyl, and the like. Various other acylated aniline derivatives and homologs can similarly be used to synthesize diaryl furans of this type. The nature and location of the substituents are chosen for the special properties which they confer on the furan, such as the metallizable groups mentioned above. Similarly, increased hydrocarbon solubility (useful for the ultraviolet absorbing compounds of this type in their incorporation in plastics) are obtained by using ring-alkylated anilines in which the alkyl group is a long chain group such as lauryl or octadecyl. In the case of alkoxy substituents, where they are to be metallizable groups, a lower alkyl is preferred, but higher alkoxy groups can be used to increase hydrocarbon solubility. Because the synthesis described above, involves reactions in which anilides bearing negative groups are difficultly reactive, such are best introduced later into the already formed diarylfuran nucleus. The sulfonations mentioned above, are one such case and other such substituents are nitro or phosphonic acid radicals. Alternatively, such negative substituents as the aldehyde and carboxylic acid radicals are obtained by using an anilide bearing a group easily oxidizable into such, as e.g., the carbinol groups —$CH_2OH$ or its esters.

Another important aspect of our invention, is that compounds of the naphthalene series may be prepared. For example, by the same general preparative methods one can obtain 2,5-dinaphthylfurans containing amino groups para to the bonds to the furan ring. For example N-acetyl derivatives of γ-naphthylamine and derivatives lead to compounds of the following types:

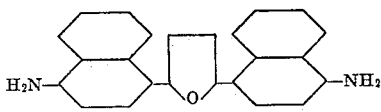

and by using acetyl derivatives of compounds such as 1-amino-2-ethoxynaphthalene, 1-amino-2,6-dimethoxynaphthalene, 1-amino-2-naphthol, 1-amino-2-naphthoic acid and 1-amino-2-naphthoxyacetic acid new intermediates are obtained which are useful for the preparation of metallized dyes and pigments. Obviously, these compounds can also be sulfonated, in fact, usually more readily than the corresponding benzene derivatives.

Brighteners containing basic substituents, are useful for non-cellulosic materials such as wool, nylon, and acetate as well as for incorporation in plastics, can be prepared by alkylating 2,5-bis(aminoaryl)-furans, using alkylating agents such as dialkyl sulfates or alkyl halides. The properties of the products will depend on the size of the alkyl group, since the larger the alkyl group the greater is the solubility to be expected in plastics. Examples of the alkyl groups which can be used are methyl, ethyl, propyl, butyl, octyl, dodecyl, octadecyl. One can also use aralkyl groups such as benzyl and substituted benzyl groups. The dialkyl sulfate is preferably used when lower alkyl groups are being introduced, but with the higher alkyl groups, the halides are usually more available. Mono or dialkylation of the amino groups is controlled by the use of appropriate quantities of reagents. Alternatively, one can synthesize the diaryl furan system with the alkylamino groups already in place by starting with an N,N-dialkylaminobenzene or naphthalene or with an acylated secondary amine of the same type.

It is very surprising that this ring system is such a useful one. It could not be predicted that derivatives of bis(para-aminoaryl)-furans would fluoresce at all. Still less, it could be predicted that such fluorescence would occur in the wave lengths necessary to make good brighteners. Similarly, it was impossible to predict that the sulfonated dyes derived from the tetrazotized diamines would be substantive to cellulosic materials under direct dyeing conditions.

This application is a division of our copending application, Serial No. 401,734, filed December 31, 1953, now U.S. Patent No. 2,852,503.

Our invention can be further illustrated by the following examples in which parts are by weight unless otherwise indicated.

Example 1

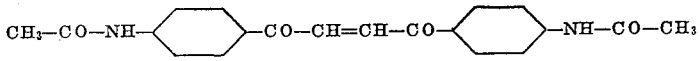

A mixture of 53.2 parts of aluminum chloride and 208 parts of symmetrical tetrachlorethane is cooled below 5° C. 29.8 parts of acetanilide is then added followed by the gradual addition of a mixture of 15.3 parts of fumaryl chloride and 48 parts of symmetrical tetrachlorethane. The mixture is then slowly heated to about 70 to 80° C. and held there until the reaction is complete. The mixture is cooled and drowned on 1000 parts of ice mixed with 25 parts of concentrated hydrochloric acid. The organic layer is thoroughly washed by decantation and the solvent is then removed by steam stripping. The solid product which remains is slurried in alcohol, filtered, and washed with alcohol. By recrystallization from acetic acid a product of good purity having a melting point of 278° C. is obtained.

Example 2

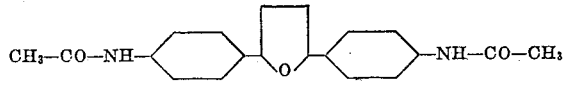

To 525 parts of a 30% solution of HBr in glacial acetic acid is added 26.2 parts of the crude product from Example 1 and 16.2 parts of beta-naphthol. The mixture is stirred at room temperature until the reaction is complete. It is then drowned on ice and the drowned slurry is basified with sodium hydroxide. During this basification the temperature is kept down to prevent decomposition. The product is isolated by filtering and washing, and purified by extraction with hot alcohol. The crude product can be recrystallized from boiling glacial acetic acid to produce lustrous light tan crystals melting at 307–308° C. This purified product gives a good analysis and shows a moderate greenish white solid fluorescence which becomes intensely bluish in solution.

If, in Example 1, propionanilide or butyranilide is used as the starting material instead of acetanilide, the products, treated as above, will give the propionyl or butyryl derivatives corresponding to the acetyl derivative above.

Example 3

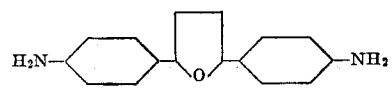

A mixture of 10 parts of the product of Example 2 and 60 parts of alcohol is stirred at reflux. Thirty-six parts of concentrated hydrochloric acid is then added gradually and the mixture is refluxed until hydrolysis is complete. The mixture is then cooled and the product is isolated by filtration. It is then taken up in boiling water and precipitated by careful basification with sodium hydroxide. The product is isolated by filtration and washing. This crude product can be recrystallized from alcohol to yield light tan crystals, melting point 216.0–216.8° C., which give the correct analysis.

Example 4

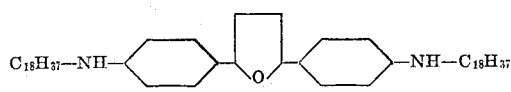

The procedure of Example 1 is followed, using N-octadecyl acetanilide in place of the acetanilide. The product is then ring-closed by the procedure of Example 2 to give 2,5-bis(p-octadecylacetylaminophenyl) furan. This is then hydrolyzed by the procedure of Example 3 to give 2,5-bis(p-octadecylaminophenyl) furan.

Similarly, by starting with N-butylacetanilide, N-laurylacetanilide, N-benzylacetanilide, or N-ethylacetanilide, the corresponding butyl, lauryl, benzyl, or ethyl derivatives are prepared.

*Example 5*

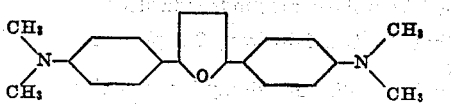

The procedure of Example 1 is followed using dimethylaniline instead of acetanilide. The product is ring-closed by the procedure of Example 2 to form 2,5-bis(p-dimethylaminophenyl) furan.

Similarly, by starting with equivalent amounts of mehyl ethyl aniline or dibutyl aniline, the corresponding 2,5-bis(p-dialkylaminophenyl) furans are obtained.

*Example 6*

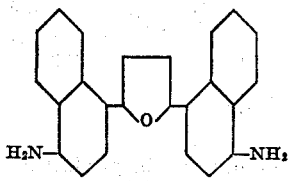

The procedure of Example 1 is followed, using N-acetyl alphanaphthylamine in place of the acetanilide. The resulting product is ring-closed by the procedure of Example 2 and hydrolyzed by the procedure of Example 3 to give 2,5-bis(4-amino-1-naphthyl) furan. Similarly, by starting with N-acetyl-2-methoxy-1-naphthylamine, N-acetyl-2-ethoxy-1-naphthylamine or N-acetyl-2-chloro-1-naphthylamine in place of the acetyl-naphthylamine, the corresponding derivatives having methoxy, ethoxy and chloro substituents next to the amino group are prepared.

*Example 7*

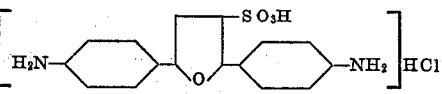

The procedure of Example 1 is followed, using acetcresidide instead of acetanilide. The product is ring-closed by the procedure of Example 2 and hydrolyzed by the procedure of Example 3 to give 2,5-bis(1-methyl-4-amino-5-methoxyphenyl) furan.

*Example 8*

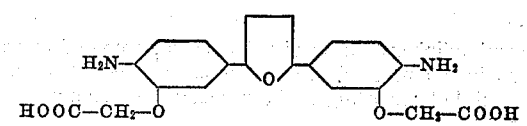

The procedures of Examples 1, 2, and 3 are followed, using N-acetyl-o-amino-phenoxyacetic acid as the starting material in place of acetanilide. The product is 2,5-bis(4-amino-3-carboxymethoxyphenyl) furan. Similarly, if N-acetyl-o-aminophenyl-thioglycollic acid is used as the starting material, 2,5-bis(4-amino-3-carboxymethylmercaptophenyl) furan is produced. By using 1-acetylamino-2-naphthyloxyacetic acid, there is similarly produced 2,5-bis(4-amino-3-carboxymethoxy-1-naphthyl) furan.

*Example 9*

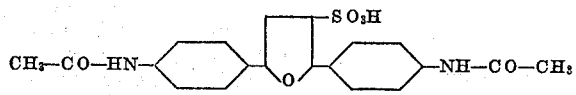

Fifty parts of 100% sulfuric acid is cooled while 8.35 parts of the product of Example 2 is added gradually. The mixture is then allowed to stir at room temperature until sulfonation is complete. It is then drowned on 100 parts of ice and the precipitated product is isolated by filtration. The latter is then slurried in 150 parts of cold water, filtered, and washed with small portions of cold water. In either alcohol or water it dissolves readily hot producing an intense blue-white fluorescence. The analysis indicates that only one sulfonic acid group has been introduced, presumably in the position indicated by the above formula, but this has not been established.

*Example 10*

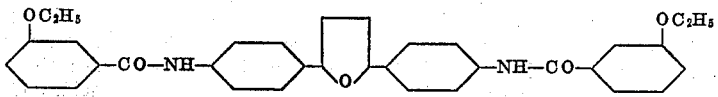

A mixture of 7.4 parts of the product of Example 9 and 40 parts alcohol is held at reflux while 24 parts of concentrated hydrochloric acid is gradually added. The mixture is then held at reflux until hydrolysis is complete. It is then cooled and the product filtered and washed with alcohol and dried. It is a gray solid very soluble in water, producing a greenish-white fluorescence in aqueous solution.

*Example 11*

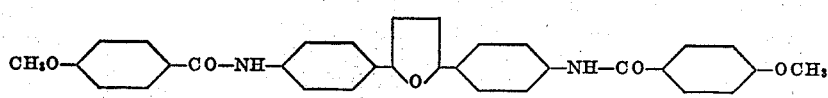

A mixture of 5 parts of the product of Example 3 and 50 parts of pyridine is stirred at the boil while 13.3 parts of ortho-ethoxybenzoyl chloride is added gradually. The mixture is then stirred at the boil until acylation is complete. The solvent is removed under pressure and the residue is taken up in 100 parts of water and 10.6 parts of sodium carbonate. The mixture is then boiled until all traces of the pyridine are removed. When it has cooled to room temperature, the light tan solid is isolated by filtration and washing, and is dried. The crude product can be recrystallized from pyridine to produce a pure, faintly yellow crystalline solid with intense fluorescence in the solid state, melting at 259–260° C.

*Example 12*

CH₃O—⟨ ⟩—CO—NH—⟨ ⟩—[O]—⟨ ⟩—NH—CO—⟨ ⟩—OCH₃

The procedure of Example 11 is followed substituting 13.6 parts of anisoyl chloride for the ortho-ethoxy benzoyl chloride of that example. The product can also be recrystallized from pyridine to give a nearly colorless solid with intense bluish-white solid fluorescence, melting point 317–318° C.

Example 13

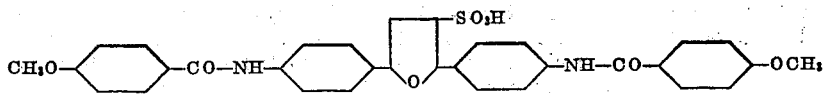

Forty parts of concentrated sulfuric acid is cooled and stirred while 10.4 parts of the product of Example 12 is added gradually. The mixture is then allowed to stir until sulfonation is complete. One-hundred parts of cracked ice is then added and the precipitated light yellow solid is isolated by filtration. It is boiled briefly in about 50 parts of water and reisolated by filtration. The solid is then slurried in 200 parts of water and heated to boiling. The hot solution is made slightly alkaline with sodium carbonate and salted with sodium chloride. A faintly yellow granular solid separates and, after cooling, the product is isolated by filtration and washing. This material shows an intense greenish-yellow solid fluorescence and an intense bluish-white solution fluorescence. Analytical data indicates the product is a monosulfonic acid, presumably having the above structure.

The product of Example 11 can be similarly sulfonated.

Example 14

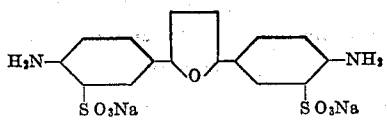

Five parts of the product of Example 3 is mixed with 60 parts of dichloro-benzene and the mixture is stirred at 140° C. while 4.12 parts of 100% sulfuric acid is added gradually. The temperature is then raised to reflux and the mixture is refluxed until sulfonation is complete. It is then cooled and 250 parts of water containing 8.9 parts of sodium carbonate added. The dichlorobenzene is removed by steam distillation and the residual slurry is clarified at the boil by filtration and washing with hot water. The filtrates are concentrated to approximately 50 parts by volume and salted with 50 parts of saturated brine. The cooled mixture is filtered to isolate the solid brown product. Analytical data establishes the presence of two sulfonic acid groups. For convenience, and from reasoning by analogy, these are assumed to be in the benzene rings as indicated above, but this structure has not been proven.

Example 15

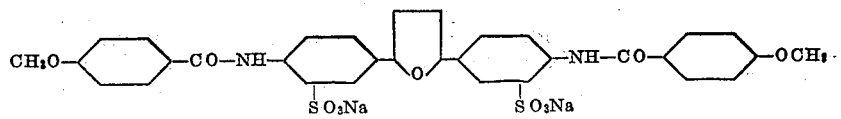

A mixture of 4.48 parts of the product of Example 14 and 30 parts of pyridine is refluxed while there is added gradually 6.44 parts of anisoyl chloride. The mixture is then stirred at reflux until the acylation is complete. 2.12 parts of sodium carbonate is added and the pyridine is removed by steam distillation. The residual mixture is then basified by adding 2 parts more of sodium carbonate. It is then diluted with water to a total of 300 parts by volume and heated to the boil. The solution is clarified hot and the boiling filtrate is salted with 21.4 parts of sodium chloride. The mixture is then cooled and the solid product is isolated by filtration and drying. It is a light brown powder which can be recrystallized from boiling water with a charcoal treatment followed by resalting to give a much purer product.

Example 16

The product of Example 3 was tetrazotized in the usual manner and the resultant solution was used to dye cloths which has previously been prepared in the standard manner with various naphthols. The following shades were obtained from the compounds indicated:

Naphthol AS-OL, 3-hydroxy-2-naphthoic-o-anisidide, violet

Naphthol AS-E, 3-hydroxy-2-naphthoic-p-chloranilide, blue violet

Naphthol AS-G, N,N'-bisacetoacetyl-o-tolidide, yellow orange

Naphthol AS-SG, 2-hydroxy-11-benzo[a]carbazole-3-carbox-p-anisidide, blue gray

Naphthol AS-BR, 4,4'-bis(3-hydroxy-2-naphthoyl-amino)-3,3'-dimethoxydiphenyl, light violet

Example 17

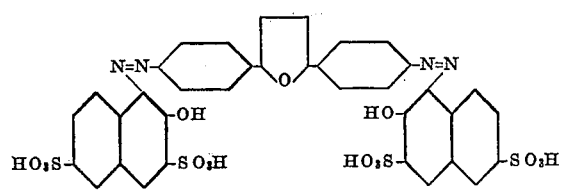

A slurry of 1.04 parts of the product of Example 3 in 20 parts of a solution containing 3 parts by volume of concentrated hydrochloric acid was diazotized at 10° C. with 0.566 part of sodium nitrite. The solution of the diazonium salt was added to a solution of 3.16 parts of 2-naphthol-3,6-disulfonic acid sodium salt in aqueous caustic at 10° C. and maintained weakly alkaline until coupling was complete. The coupling product was filtered off and purified by reprecipitation by means of sodium acetate from solution in a caustic-pyridine mixture. The product dyed cotton a bright reddish blue shade.

In the same manner, the above tetrazo compound can be reacted with other sulfonated azo coupling components such as 2-naphthol-6,8-disulfonic acid, 2-naphthol-6-sulfonic acid, and 2-naphthol-8-sulfonic acid to form the other corresponding direct dyes. If unsulfonated azo coupling components such as beta naphthol, 2-hydroxy-3-naphthoic acid and its arylides, arylides of acetoacetic acid, and pyrazolones such as 1-phenyl-3-methyl pyrazolone-5 are used, the corresponding azo pigments are obtained.

If, instead of the product of Example 3, the product of Example 7 or 8 is used, the dye so obtained can be metallized with copper or chromium to give much faster shades. Such metallization can be carried out before application to the cloth or (in the case of the product derived from Example 7) after application to the cloth.

Example 18

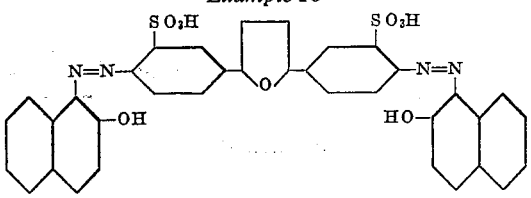

Diaminodiphenyl furan disulfonic acid, prepared as described in Example 14, was diazotized and coupled with beta naphthol according to the procedure of Example 16.

The product was isolated as usual and found to dye cotton and rayon a bright, reddish blue shade.

Shades varying from reddish yellow to blue red or violet may be obtained by using coupling components such as acetoacetarylides, 5-pyrazolones, 1-phenyl-3-methyl-5-pyrazolone, acylacetonitriles, and arylides of 2-hydroxy-3-naphthoic acid.

Similar results are obtained if the diaminodiphenyl furan monosulfonic acid of Example 10 is used in place of the disulfonic acid. The product differs primarily in solubility.

We claim:

1. The compound of the structure:

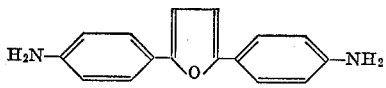

2. The compound of the structure:

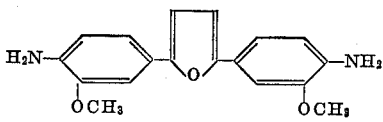

3. The compound of the structure:

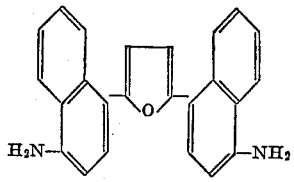

4. Compounds of the structure:

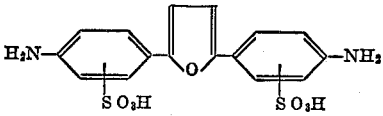

5. A compound which has the structure:

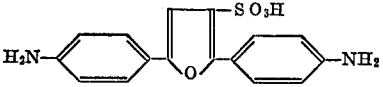

6. 2,5-bis(4-aminoaryl)furans of the formula

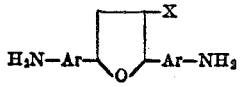

in which X is selected from the group consisting of hyhydrogen and sulfonic acid and in which Ar is a carbocyclic aromatic radical having less than three six-membered rings, the amino group being in a position para to the furan ring.

7. Compounds of claim 6 in which said aryl radical has two fused rings.

8. 2,5-bis(4-acylaminoaryl)furans of the formula

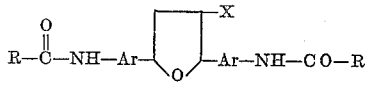

in which X is selected from the group consisting of hydrogen and sulfonic acid; Ar is a carbocyclic aromatic radical of less than three six-membered rings and RCO— is a carboxylic acyl radical which is selected from the group consisting of lower alkanoyl, benzoyl, lower alkoxybenzoyl, lower alkylbenzoyl and benzoylaminobenzoyl, the acylated amino group being in a position in Ar para to the furan ring.

9. Compounds of claim 6 in which the said aryl radicals have only one such ring.

10. Compounds of the formula

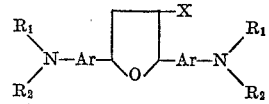

in which X is selected from the group consisting of hydrogen and sulfonic acid, Ar is a carbocyclic aromatic radical of less than three six-membered rings, the amino nitrogen being in a position para to the furan ring, and in which $R_1$ is alkyl, $R_2$ being selected from the group consisting of hydrogen and alkyl.

11. The compounds of claim 10 in which X is hydrogen and $R_2$ is alkyl.

12. The compounds of claim 10 in which X is hydrogen and $R_2$ is hydrogen.

References Cited in the file of this patent

UNITED STATES PATENTS

| | | |
|---|---|---|
| 2,480,450 | Cocroft et al. | Aug. 30, 1949 |
| 2,641,597 | Goldberg | June 9, 1953 |
| 2,641,601 | Goldberg | June 9, 1953 |

OTHER REFERENCES

Guyot et al.: Annales de Chemie, vol. 19, eighth series, pp. 297–353 (1910).